United States Patent [19]

Cussler

[11] Patent Number: 4,938,931

[45] Date of Patent: Jul. 3, 1990

[54] MICROPOROUS MEMBRANE TRICKLE BED REACTOR

[75] Inventor: Edward L. Cussler, Edina, Minn.

[73] Assignee: Hoechst Celanese Corporation, Somerville, N.J.

[21] Appl. No.: 54,351

[22] Filed: May 26, 1987

[51] Int. Cl.$^5$ ............................ B01J 8/08; B01J 10/00
[52] U.S. Cl. .................................... 422/211; 210/638; 422/239; 435/284; 435/285
[58] Field of Search ................ 422/211, 239; 210/638; 435/284, 285

[56] References Cited

U.S. PATENT DOCUMENTS

| | | |
|---|---|---|
| 3,472,765 | 10/1969 | Budd et al. |
| 3,849,076 | 11/1974 | Gryaznov et al. |
| 4,014,657 | 3/1977 | Gryaznov et al. |
| 4,201,845 | 5/1980 | Feder et al. |
| 4,255,591 | 3/1981 | Makin et al. |
| 4,266,026 | 5/1981 | Breslau .......................... 435/182 X |
| 4,442,206 | 4/1984 | Michaels et al. ............. 435/174 X |
| 4,542,010 | 9/1985 | Roman et al. ................. 422/211 X |
| 4,543,236 | 9/1985 | von Gise ....................... 435/284 X |
| 4,603,109 | 7/1986 | Lillo .............................. 422/192 X |
| 4,647,380 | 3/1987 | Dasgupta ........................... 210/638 |
| 4,647,539 | 3/1987 | Bach ................................. 435/284 |
| 4,661,257 | 4/1987 | Kreevoy et al. .................. 210/638 |

FOREIGN PATENT DOCUMENTS 2025256 1/1980 United Kingdom.
2093730 9/1982 United Kingdom.

OTHER PUBLICATIONS

Bennett et al., Momentum, Heat and Mass Transfer, 3rd Ed., McGraw-Hill, NY, NY (1982), pp. 491-493, 523.
Chem. Abs. 90:85259x.
Yang, Ming-Chien, and Cussler, E. L., "A Hollow Fiber Trickle Bed Reactor", Dept. Chem. Eng. and Mat. Sci., U. of Minn.
Chemical Abstracts, vol. 94, No. 20, 5/18/81, p. 113, No. 158802p, Columbus, Ohio, U.S.; &JP-A-80 119 439 (Toyobo Co., Ltd.), 13-09-1980.
Chemical Abstracts, vol. 90, No. 26, 6/25/79, p. 159, No. 206653g, Columbus, Ohio, U.S., & JP-A-78 130 291 (Agency of Ind. Sciences & Technology), 14-1-1-1978.
International Journal of Hydrogen Energy, vol. 9, No. 10, 1984, pp. 835-839, "Enhanced Catalytic Decomposition of HI by Using a Microporous Membrane".

Primary Examiner—Robert J. Warden
Assistant Examiner—Jill Johnston
Attorney, Agent, or Firm—K. A. Genoni; B. H. Davidson; J. M. Brown

[57] ABSTRACT

Trickle bed reactors are prone to channelling, flooding, and similar flow problems. It has been found that these problems can be avoided by the use of a microporous membrane to separate a reactant fluid phase from a catalysis fluid phase surrounding a catalyst bed. An advantage of such a reactor is that the fluid flows can be separately controlled. An apparatus useful as a trickle bed reactor can include a plurality of microporous hollow fibers arranged in a shell-and-tube configuration within a housing. Such an apparatus is operated with a reactant fluid phase flowing through the fibers and with a catalyst bed on the shell-side of the arrangement.

9 Claims, 2 Drawing Sheets

MICROPOROUS MEMBRANE TRICKLE BED REACTOR

BACKGROUND OF THE INVENTION

The present invention relates to catalytic reactors and processes for using the same. More particularly, the present invention relates to chemical reactors, and processes employing the same, having a catalyst bed and including a microporous membrane separating a reactant phase from a zone where a catalytic reaction occurs.

Strictly speaking, a trickle bed reactor is a chemical reactor with a catalyst bed wherein the fluid flow is in the trickle flow regime, that is, rather low fluid flow rates. A conventional trickle bed system contains a continuous gas phase with a dispersed liquid phase. Increasing the gas flow rate can lead to pulsed or spray flow regimes. On the other hand, for higher liquid flow rates the gas may become the dispersed phase, thereby resulting in bubble flow regimes. In general, then, trickle bed reactors require low flow regimes, i.e., Reynolds numbers for both the gas and liquid phases of less than about 1,000. Increased flow rates in trickle bed reactors can result in flow variations and instabilities. In addition, channelling, incomplete loading, or flooding can result in the locale of the catalyst bed.

In operation, a typical trickle bed reactor has a fixed catalyst bed positioned vertically. A liquid medium flows downwardly through the bed while a gaseous reactant stream flows countercurrently upward through the bed. For a reaction to occur, the gaseous reactant must diffuse into the liquid phase, then diffuse to the catalyst particles, and then react. The reaction products, if soluble in the liquid phase, are removed therefrom.

The total reaction mechanism in such a system thus includes the steps of diffusion and reaction. The reactants must diffuse into the liquid phase and then diffuse to the catalyst particles, and the reaction rate is thus affected by the rate of diffusion to the catalyst particles. Assuming a situation where the catalytic reaction occurs at the surface of the catalyst particles, the reaction rate is affected further by the reaction rate constant, the concentration of the reactants at the particle surface, and the surface area of the catalyst particles. The resulting reaction products must then diffuse away from the catalyst particles and back to the mainstream liquid flow. Accordingly, the final reaction rate, as controlled by the slowest of the aforementioned steps, is affected most by either the rate at which catalysis proceeds or the rate at which diffusion of the reactants and the products proceeds. The primary resistance to diffusion occurs at boundary layer areas, and thus it would be advantageous to increase both the gas and the liquid flow rates to decrease such boundary layers. It would also be advantageous to increase the flow of either or both fluid phases while avoiding channelling and other flow problems which would be expected to occur with a conventional trickle bed reactor.

There is a species of reactors which use hollow fibers, but these reactors are specifically directed to biological systems. See, e.g., U.S. Pats. Nos. 4,201,845 and 4,442,206. In these biological reactors, a cell culture is fixed to or isolated by a microporous membrane, while a nutrient supply flows adjacent to and on the other side of the membrane. One disadvantage of such systems is that the viability of the cells must be rigorously assured, especially regarding temperature, pH, oxygen concentration, and salinity and osmotic pressure. Also, the products of biological reactors must diffuse back across the membrane to be removed, and thus higher concentrations of product on the cell culture side of the membrane not only decrease yields but also threaten cell viability. Even further, biological reactors will yield by-products other than the specifically desired biologically derived product. The present invention suffers from none of the foregoing disadvantages.

SUMMARY OF THE INVENTION

Accordingly, it is an object of the present invention to provide a trickle bed reactor that advantageously allows flows to be varied, especially increased, without any of the aforementioned detrimental results. Another object of the present invention is to provide a catalytic reactor having liquid and gas streams wherein the flow of each stream can be independently controlled.

The present invention provides a chemical reactor, comprising a reactant fluid zone, a catalysis fluid zone including a catalyst, and a microporous membrane separating the reactant zone from the catalysis zone. In various preferred aspects, the reactant zone includes a reactant fluid flow, the catalysis zone includes a fluid flow, and the microporous membrane is in the geometry of a hollow fiber, most preferably as a plurality of hollow fibers.

The present invention also provides an apparatus for use as a chemical reactor, comprising a plurality of microporous hollow fiber membranes arranged in a substantially parallel configuration, a housing surrounding and securing the fiber membranes, the housing being in the form of a shell portion in a shell-and-tube arrangement wherein the fibers constitute the tube portion, a means for providing a reactant flow through the fiber membranes, a fixed catalyst bed in the shell side of the housing, and a means for providing a fluid flow through the shell side.

Still further, the present invention provides a catalytic reaction process, which comprises providing a reactant species in a fluid, providing a catalysis fluid medium and a catalyst, and separating the reactant from the catalyst with a microporous membrane, wherein the reactant species diffuses across the membrane to the catalyst, whereupon a catalytic reaction occurs. In various preferred aspects, the membrane is provided in the shape of a hollow fiber and most preferably as a plurality of hollow fibers, a fluid flow is established about the catalyst, and a reaction product is removed from the catalysis fluid medium wherein the remaining catalysis fluid medium is recirculated to the reaction zone.

An advantageous feature of the present invention is that each of the fluid flows can be independently controlled. An additional novel aspect is that the present invention is advantageously employed when it is desirable to avoid contact between the reactant stream and the catalyst. A further advantage over traditional trickle bed reactor systems is that the catalyst bed need not be vertically disposed.

DETAILED DESCRIPTION OF THE PREFERRED EMBODIMENTS

Figure 1:
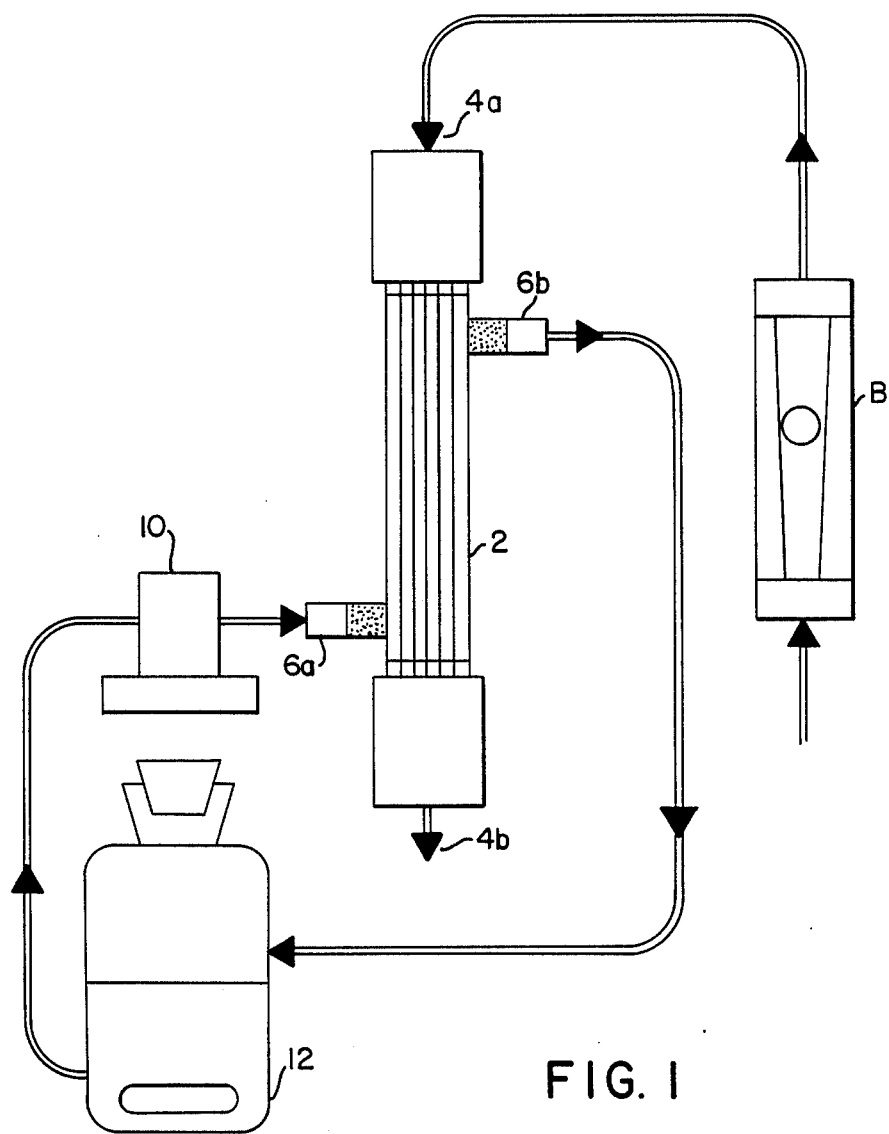
FIG. 1 depicts a reactor apparatus of the present invention.

The present invention relates to apparatus and processes for conducting catalytic reactions within the apparatus. Such reactors typically include two flowing fluid phases and a catalyst bed. Usually a fixed catalyst bed is employed and a liquid phase flows downwardly through the bed while a gaseous reactant phase flows upwardly.

In the present invention, the two fluid phases are separated by a microporous membrane. On one side of the membrane is a reactant fluid phase. On the other side of the membrane is the catalyst bed surrounded by a catalysis fluid phase. The catalysis fluid is not a catalyst bed, but rather a reaction medium in which the catalysis occurs. In operation, the reactant or reactants diffuse through the membrane and then to the catalyst particles. A catalytic reaction occurs at the catalyst particles, either at the outermost surface and/or within pores, and the subsequent reaction products diffuse away from the catalyst particles into the catalysis fluid for removal. The reaction products are soluble in the catalysis fluid phase and are removed therefrom by methods known to those of ordinary skill in the art.

The membrane used is microporous, such that reactants can diffuse through the membrane pores rather than through the bulk polymeric material. To allow for a higher diffusion rate, the membrane geometry is preferably in the form of a hollow fiber, and in practice a plurality of hollow fibers is most preferably utilized. A preferred product in this regard is commercially available from Celanese Fibers Co. under the tradename Celgard X20, a polypropylene microporous hollow fiber having an inner diameter of about 413 microns.

The reactant and catalysis fluid phases must be relatively immiscible. The reactant fluid phase can be gaseous, such as when oxygen is used as a reactant in a reactant fluid phase comprising air. The catalysis fluid phase is preferably liquid, such as water. A preferred combination of fluid phases includes at least one non-aqueous fluid phase. The other fluid phase can then be either aqueous or non-aqueous, as long as the fluid phases are essentially immiscible. Examples of the first and second fluid phases include air and water, chlorofluorocarbon and hyrdocarbon, or alcohol and phenol. Each of these combinations of phases includes immiscible fluids.

It is important to note that the microporous membrane can be wet spontaneously by a fluid phase with which it is compatible. For example, if the first fluid phase were aqueous and the membrane were hydrophilic, the pores of the membrane would spontaneously fill with the liquid. If a hydrophilic membrane were used with an aqueous liquid phase, by properly adjusting the pressures of both fluid phases, the aqueous liquid phase could be prevented from filling the membrane pores. It is preferable to select the membrane characteristics such that it is spontaneously wet by the fluid phase in which the reactant is more soluble. As noted above, a primary resistance to diffusion occurs at the boundary layers, such as at the membrane. The reactant species must diffuse through the membrane pores and then through the bulk catalysis fluid phase to the catalyst particles. The resistance to diffusion that occurs at the boundary layer between the membrane and a fluid phase can be lessened by selecting the membrane such that it is spontaneously wet by the fluid phase in which the reactant species is more soluble. This selection also decreases the resistance attributable to the membrane pores during diffusion of the reactant species. Other desirous characteristics of the membrane include a thin membrane with high porosity and a geometry which exhibits a high surface area to volume ratio, such as a hollow fiber. Additionally, the membrane should be chemically inert to both of the fluid phase and to the reactant and product species.

In certain embodiments, the reactant fluid phase can be gaseous. In such cases, the reactant fluid phase can include both a carrier gas and gaseous reactant species. In all cases, the reactant species is soluble in both the reactant fluid phase (such as if a carrier gas is used) and the catalysis fluid phase.

Thus, the reactants diffuse from the reactant fluid phase, through the membrane pores, and into the catalysis fluid phase to the catalyst particles. The reaction occurs at the catalyst particles and the products diffuse back into the catalysis fluid phase from which they are removed. Alternatively, the products may diffuse back across the membrane into the reactant fluid phase and be removed therefrom. Accordingly, the catalysis fluid phase should be inert with respect to both the reactant(s), the product(s), and in certain instances the reactant fluid phase should also be inert regarding the products. It is a matter of design choice and the particular reactant and product involved which effects whether the products end up and are removed from the catalysis or the reactant fluid phase.

Accordingly, the process of the present invention includes providing a catalyst, providing a reactant species, and separating the two with a microporous membrane, wherein the reactant species diffuses across the membrane to the catalyst where it undergoes a catalytic reaction.

The present process finds application in any reaction environment meeting the above-mentioned constraints regarding the inertness of the fluid phases and the membrane. Specific reactions for which the present process is useful include selective catalytic hydrogenation (e.g., cyclohexene to cyclohexane) and selective catalytic oxidations (e.g., sulfur dioxide to sulfur trioxide).

The present process can be conducted in an apparatus of the present invention which is depicted in FIG. 1. In reference to FIG. 1, a housing 2 is provided which includes at least two distinct regions or zones separated by a microporous membrane. One of the zones has a catalyst bed therein. It is preferred that the membrane be in the geometry of a hollow fiber and that a plurality of hollow fibers be utilized. In such a case, it is preferred that the fibers and the housing be arranged in a shell-and-tube configuration wherein the fibers constitute the tube portion. It is then most preferred that the catalyst be present in the zone constituting the shell portion.

FIG. 1 depicts a shell-and-tube arrangement wherein 4a and 4b are the tube-side inlet and outlet, respectively, and 6a and 6b constitute the shell-side inlet and outlet, respectively. This is a preferred arrangement where the respective shell-side and tube-side flows are countercurrent to each other. In various instances, a co-current flow scheme may be more preferable.

To illustrate the present invention, the following example is offered, but is not to be considered limiting in any manner.

EXAMPLE

This example illustrates the oxidation of sulfur dioxide by use of the process and apparatus of the present invention. The reaction can be described as $SO_2 + \frac{1}{2}O_2 \rightarrow SO_3$ where a catalyst comprising activated carbon is used.

The reactor depicted in FIG. 1 was used. The housing 2 included a hollow fiber module with activated carbon on the shell-side (a glass wool plug was used in the inlet 6a and outlet 6b to prevent loss of the catalyst). This hollow fiber module had 61 fibers, which are available under the tradename Celgard X20, and each had an inner diameter of 413 microns. The catalyst on the shell-side was composed of activated carbon with a particle size of $35 \times 100$ mesh or an average particle size of 0.032 cm.

The reactant side included a gaseous stream of air and sulfur dioxide, which was blown through the tube-side. The gas flow was measured with rotameter 8. The shell-side contained the fixed catalyst bed and water which was circulated by a metering pump 10 from a stirred reservoir 12 from which samples were taken.

The aqueous concentration of the sulfur trioxide product was periodically sampled and analyzed. The concentration of dissolved oxygen was determined by an oxygen electrode (Orion Research No. 97-08-00). The concentration of sulfur trioxide was determined by well-known titration methods.

Assuming that the reaction occurs at the surface of the catalyst particles and that first order kinetics thus apply, the reaction rate can be calculated from the formula $r=(V/W)(d[SO_4^{2-}]/dt)$ wherein r is the reaction rate, W is the total weight of the catalyst in the bed, and V is the volume of the catalyst in the bed. This reaction rate was then plotted against various liquid and gaseous flow rates.

The results obtained using the present process and apparatus were compared with results achieved in conventional trickle bed systems as reported by Berruti, F., et al., "Oxidation of Sulfur Dioxide in a Trickle-Bed Reactors, a Study of Reactor Modelling," Can. J. Chem. Eng., vol. 62, 644–50 (1984).

Figure 2:
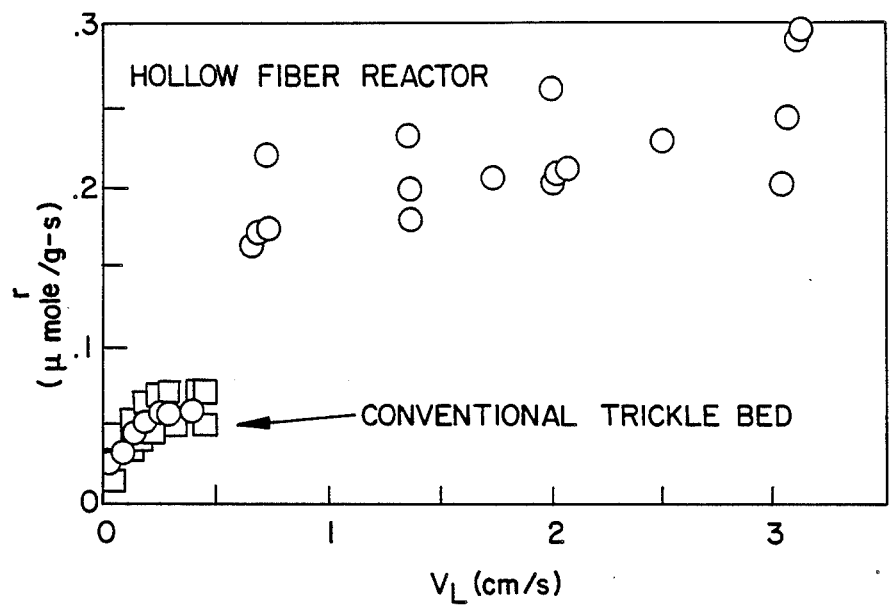
FIG. 2 depicts a comparison of the reaction rates achieved by the present invention with respect to a conventional trickle bed reactor.

These comparative results are depicted in FIG. 2, wherein the square data points represent the reaction rate in a conventional trickle-bed reactor of Berruti et al. and the circular data points are from the present example. The ordinate $V_L$ is the liquid velocity in the catalyst bed and the abscissa r is the reaction rate as defined above. It is seen in FIG. 2 that at low liquid flow rates, the present reaction rates are commensurate with those found previously for trickle bed reactors, thus showing that both systems have the same chemistry. At intermediate flow rates, the present invention achieves reaction rates which are faster than those achieved in a conventional trickle bed reactor. Moreover, such higher rates are achieved at liquid velocities which would result in flooding of a conventional trickle bed reactor. It appear that at the highest liquid flow rates the reaction rate approaches, as an asymptote, a reaction rate independent of mass transfer and controlled solely by chemical kinetics. Accordingly, the present invention appears to have overcome the significant resistances to mass transfer found in conventional trickle bed reactors.

While not desirous of being constrained to any particular theory, it is believed that mass transfer in a microporous membrane trickle bed reactor is controlled primarily by the resistances to mass transfer in the catalysis fluid phase and by the reaction rate constant. The resistances in the liquid phase are due primarily to the boundary layers at the membrane-liquid interface and at the liquid-catalyst interface. When the reaction rate determined in the present example is compared with that found in a conventional trickle bed reactor, no appreciable difference is found until the fluid flow rates are increased such as to substantially negate the boundary layer effects. Moreover, the problems of channeling and flooding are avoided. Further, as specifically shown in the example, the gas and liquid flows are independently controllable. In general, the feasibility of microporous membrane trickle bed reactors have been demonstrated.

The present invention may be adapted to various uses in various aspects. For example, the reaction product can be extracted from the catalysis fluid phase, and preferably the remaining catalysis fluid is recycled to the reactor. The clarification of the catalysis fluid phase to remove the product can be accomplished by any number or combination of unit operations well-known to those of ordinary skill in the art, such as distillation (vacuum or thermal), chemical precipitation, crystallization, membrane separation, and the like. It is also contemplated that the catalyst can flow with the catalysis fluid phase, whereby the catalyst can be separated, and regenerated if desired, or new catalyst can be added without taking the reactor off-line.

The foregoing descriptions are meant to illustrate and explain various embodiments of the present invention. Modifications and alterations by those of ordinary skill in the art are contemplated as being within the scope and spirit of the present invention as defined by the claims.

What I claim is:

1. A catalytic reaction process comprising the steps of:
   (a) confining a reactant fluid containing a reactant species, in a reactant fluid zone;
   (b) confining a catalysis fluid, which is relatively immiscible in the reactant fluid, and a catalyst in a catalysis fluid zone;
   (c) establishing a boundary layer between said reactant and catalysis fluids by separating the fluids using a hollow fiber microporous membrane; and
   (d) forming a reaction product by allowing the reactant species to diffuse through the pores of the hollow fiber microporous membrane to the catalyst across said boundary layer, wherein said step of separating the reactant and catalysis fluids includes the steps of:
   (i) providing a hollow fiber microporous membrane which is compatible with and spontaneously wettable by that one of said reactant and catalysis fluids in which said reactant species is more soluble, and
   (ii) minimizing resistance to diffusion of said reactant species through the pores of the hollow fiber microporous membrane to the catalyst by allowing said one fluid to spontaneously wet said membrane so that said one of said reactant and catalysis fluids fills the pores of said hollow fiber microporous membrane.

2. The process of claim 1, wherein said reactant fluid is gaseous and said membrane is hydrophobic.

3. A catalytic reaction process according to claim 1 further comprising removing the reaction product from the catalysis fluid of the catalysis fluid zone and recirculating the catalysis fluid into the catalysis fluid zone.

4. A continuous catalytic reaction process comprising the steps of:
   (a) circulating a continuous flow of a gaseous reactant fluid containing a reactant, in a reactant fluid zone;
   (b) circulating a continuous flow of a liquid medium, which is relatively immiscible in said reactant fluid, through a catalyst bed;
   (c) establishing a boundary layer between the respective flows of reactant fluid and liquid medium by separating the flow of reactant fluid from the flow of the liquid medium using a plurality of microporous hollow fiber membranes; and
   (d) allowing the reactant to diffuse through the pores of the microporous hollow fiber membranes and across the boundary layer to react with the catalyst bed to produce a reaction product,
   wherein said step (c) of separating the flows of reactant fluid and liquid medium includes the steps of:
   (i) providing hollow fiber microporous membranes which are compatible with and spontaneously wettable by that one of said reactant fluid and liquid medium in which said reactant is more soluble, and
   (ii) minimizing resistance to diffusion of said reactant through the pores of the hollow fiber microporous membranes to the catalyst bed by allowing said one of said reactant fluid and liquid medium to spontaneously wet said microporous membranes so that it fills the pores of said microporous membranes.

5. The process of claim 4, further comprising continuously withdrawing said liquid containing said reaction product, recovering said reaction product from said liquid, and recirculating the remaining liquid as said flow through said catalyst bed.

6. The process of claim 4, wherein said membrane comprises microporous polypropylene and said liquid is aqueous.

7. A process for the continuous catalytic reaction of a reactant species to form a reaction product thereof, comprising the steps of:
   (a) providing a reaction vessel having an outer housing defining an interior space and a number of hollow microporous fiber membranes arranged essentially parallel to one another within said interior space of said housing, each of said hollow microporous fiber membranes having a central lumen and a wall which defines a number of pores;
   (b) establishing a reactant fluid zone in one of said central lumens of said hollow microporous fiber membranes or said interior space of said housing, and establishing a catalysis fluid zone in the other of said central lumens of said hollow microporous fiber membranes or said interior space of said housing, said catalysis fluid zone containing a catalyst for the catalytic reaction of said reactant species to form said reaction product;
   (c) providing and passing continuous flows of (i) a reactant fluid which contains said reactant species through said reactant zone, and (ii) a catalysis fluid, which is relatively immiscible in said reactant fluid, through said catalysis zone, while establishing a boundary layer between said continuous flows of said reactant and catalysis fluids by separating said continuous flows of reactant and catalysis fluids using said hollow microporous fiber membranes;
   (d) allowing said reactant species to diffuse from said reactant fluid across said established boundary layer and into said catalysis fluid to thereby allow said reactant species to catalytically react in the presence of said catalyst to form said reaction product thereof; and
   (e) removing said reaction product from said reaction vessel; wherein
   (f) said step (c) includes the step of minimizing diffusion resistance of said reactant species from said reactant fluid and into said catalysis fluid across said established boundary layer by filling said pores of said hollow microporous fiber membranes with that one of said reaction and catalysis fluids with which said reactant species is more soluble.

8. A process as in claim 7, wherein said flows of said reactant and catalysis fluids are cocurrent.

9. A process as in claim 7 wherein said flows of said reactant and catalysis fluids are countercurrent.

* * * * *